United States Patent

Parker

[15] 3,648,158
[45] Mar. 7, 1972

[54] CONDUCTIVITY CELL FOR PARTICLE COUNTING SYSTEM

[72] Inventor: Bernard Parker, Westport, Conn.
[73] Assignee: Contraves AG, Zurich, Switzerland
[22] Filed: June 1, 1970
[21] Appl. No.: 41,982

[52] U.S. Cl. ..........................................324/30 B, 324/71 CP
[51] Int. Cl. ..........................................................G01n 27/42
[58] Field of Search ..............324/30, 30 B, 71 PC, 29, 29.5; 235/92 PC; 73/61, 432 PS

[56] References Cited

UNITED STATES PATENTS

| | | | |
|---|---|---|---|
| 2,709,781 | 5/1955 | Douty | 324/30 B |
| 2,330,394 | 9/1943 | Stuart | 324/30 B |
| 3,165,692 | 1/1965 | Isreeli | 324/71 PC |

FOREIGN PATENTS OR APPLICATIONS

| | | | |
|---|---|---|---|
| 480,542 | 2/1938 | Great Britain | 324/30 R |

*Primary Examiner*—Michael J. Lynch
*Attorney*—Werner W. Kleeman

[57] ABSTRACT

For use in systems for counting particles suspended in a liquid by detection of changes in the impedance of a fluid path caused by passage of particles through an aperture, a conductivity cell having a pair of electrodes with an easily removable aperture disposed therebetween and a vent disposed with respect to the electrodes to permit purging of the cell after an analytical run.

3 Claims, 7 Drawing Figures

Patented March 7, 1972

INVENTOR
BERNARD PARKER

ATTORNEYS

INVENTOR
BERNARD PARKER
ATTORNEYS

CONDUCTIVITY CELL FOR PARTICLE COUNTING SYSTEM

FIELD OF THE INVENTION

This invention relates to particle counters and more particularly to conductivity cells for the precise counting of particles suspended within a liquid medium.

BACKGROUND OF THE INVENTION

Systems are known for counting particles suspended in a liquid, a major application of such systems being the counting of red and white blood cells. In general, such particle counting systems include a pair of electrodes disposed within a fluid path and having an aperture disposed therebetween through which the particle-containing fluid flows. The impedance of the fluid path as sensed by the electrodes is materially altered by the presence of a particle within the aperture, giving rise to electrical pulses which can be electrically counted and which correspond to the number of particles passing through the aperture. Means are usually employed for metering a known volume of particle-containing liquid such that a particle count for a known volume of liquid can be provided.

Particle counting systems of known construction are usually quite complex and rather expensive. The high cost of conventional systems limits their availability to many who would otherwise have use for such systems. The aperture through which particles are caused to flow for counting are usually provided in conventional systems within a glass vessel and are not easily removable for cleaning or replacement. In general, the entire vessel must be removed or disassembled to gain access to the aperture. In addition, known systems often require many manipulative steps during operation in order to provide the requisite analysis, and are often difficult to calibrate and monitor during operation.

SUMMARY OF THE INVENTION

In accordance with the invention, a conductivity cell is provided having a pair of electrodes therein and having an easily adjustable and interchangeable aperture disposed between the electrodes and sized to accommodate particles under analysis. The conductivity cell is embodied within a particle counting system which can include metering means to determine the volume of liquid which is to be analyzed. The passage of particles through the aperture of the cell alters the impedance of the path through the aperture, and the change in impedance causes a corresponding change in voltage level which is sensed by appropriate detection circuitry.

In a typical embodiment, the cell is of generally cylindrical configuration and has an aperture support member removably disposed within one end thereof. The support member includes an aperture disposed in a wall thereof and when the support member is within the cell, the aperture is disposed between first and second electrodes which are disposed in respective input and output fluid passages of the cell. The cell is easily installed within a system by input and output fluid couplings provided thereon, and electrical connection to the cell electrodes is usually accomplished by terminals provided on the cell.

A vent passage is provided in the cell body and communicates with the output passage therein. During an analytical run the vent is closed to permit flow of fluid through the cell for analysis. After an analytical run the vent is opened to purge fluid from the cell, which enables the cell for a subsequent run and which also eliminates conduction between the electrodes. The electrode within the output passage is disposed with respect to the vent such that any gas bubbles which may tend to appear on the electrode surface, for example due to electrolysis, are readily removed from the cell during the purging thereof along with fluid within the cell.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
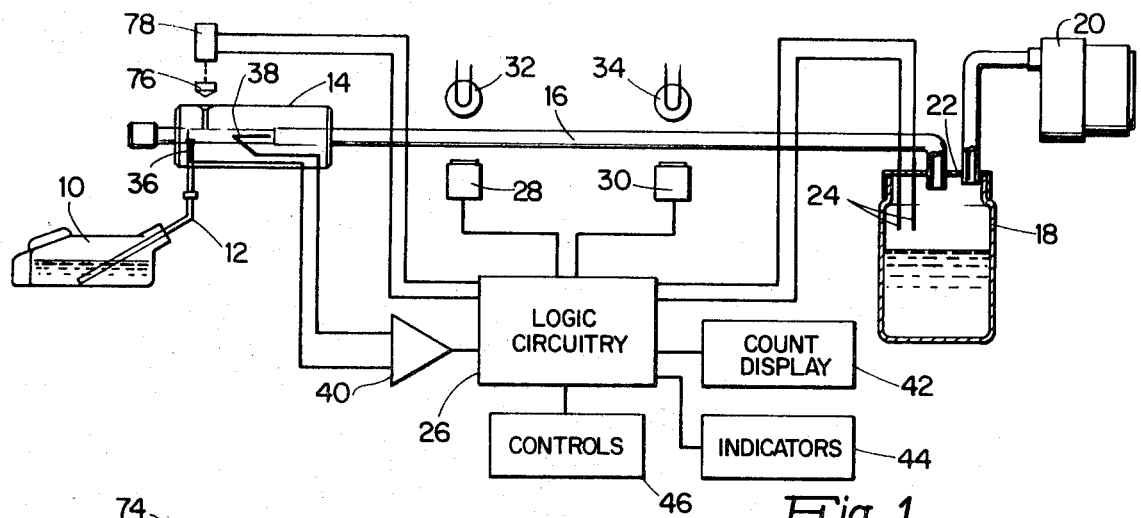
FIG. 1 is a diagrammatic representation of a particle counting system embodying the invention.

For purposes of illustration, the novel conductivity cell is shown within a particle counting system which is especially adapted for counting blood cells. The system is illustrated in FIG. 1 and is itself the subject of U.S. Pat. application entitled Particle Counting System, Ser. No. 38,039, filed May 18, 1970, and assigned to the assignee of the present invention.

The particles to be counted are suspended within a liquid contained with a sample flask 10, and fluid is drawn from flask 10 into the system by means of a tube 12. The particle-containing fluid is drawn from flask 10 by way of tube 12 to the input orifice of a novel conductivity cell 14 which includes a pair of electrodes with an aperture disposed therebetween and through which the fluid to be analyzed flows. The conductivity cell, which is the subject of the present invention, will be described in detail hereinafter.

Conductivity cell 14 is coupled to a flow tube 16 which terminates in a waste bottle 18. A suction pump 20 is also coupled to waste bottle 18 through a suitably sealed stopper 22 and is operative to draw sample fluid from flask 10 through conductivity cell 14 and flow tube 16 for analysis. A pair of electrodes 24 are disposed within waste bottle 18 and are coupled to logic circuitry 26 for the detection of a predetermined upper level of waste fluid within bottle 18 to prevent overflow of waste fluid from the bottle and to also prevent the possible entry of waste fluid into suction pump 20 in the event of such overflow. A first photosensor 28 is disposed adjacent flow tube 16 at a predetermined position along the length thereof and a second photosensor 30 is similarly disposed with respect to flow tube 16 in a position downstream from the first photosensor 28. Flow tube 16 is formed of a suitable light transmissive material such as glass and a pair of light sources 32 and 34 are arranged in operative association with respective photosensors 28 and 30. The photosensors are connected to logic circuitry 26 and are employed to provide electro-optical metering of the volume of liquid to be analyzed.

In the absence of fluid flowing within tube 16, photosensors 28 and 30 receive light from respective sources 32 and 34. During the passage of fluid within tube 16, however, the respective photosensors 28 and 30 do not receive light from their respective illumination sources. An electrical output signal is thus provided to logic circuitry 26 by photosensors 28 and 30 depending upon the presence of fluid at the sensor locations. The particle counting operation is commenced and terminated by gating signals provided by this electro-optical metering system. The passage of fluid within tube 16 past photosensor 28 causes a signal to be applied to logic circuitry 26 to commence a counting operation, while the counting operation is terminated upon receipt of a signal from photosensor 30. In this manner, a counting run is accomplished on a metered volume of liquid determined by the internal dimensions of flow tube 16 and the distance between the metering photosensors 28 and 30. The photosensitive metering technique itself is described in detail in copending U.S. Pat. application, Ser. No. 121,068, entitled Automatic Particle Counting System and assigned to Contraves AG.

The electrodes 36 and 38 of conductivity cell 14 are connected to an input amplifier 40 which is a high input impedance, lownoise, high-gain operational amplifier. The output of amplifier 40 is coupled to logic circuitry 26 and the logic circuitry is operative to provide an output indication of particle count on a suitable display 42 and to energize suitable indicators 44. Operating controls 46 are coupled to logic circuitry 26 for enabling system operation.

Figure 2A:
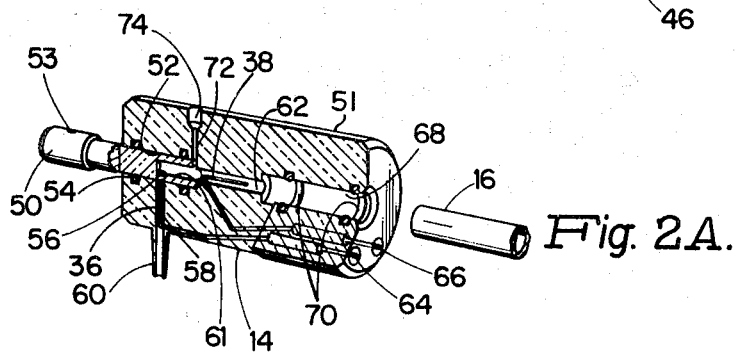
FIG. 2A is a pictorial view, partly in section, illustrating a conductivity cell according to the invention.

The novel conductivity cell through which the sample fluid is caused to flow and in which the changes in impedance caused by the presence of particles within an aperture are detected is illustrated more particularly in FIG. 2A. The cell 14 is of generally cylindrical configuration and typically is formed of a plastic material such as plexiglass or other polycarbonate plastic which is inert to the fluids being analyzed and which is electrically insulative. An aperture support 50, also typically formed of the same plastic material, is supported within a cylindrical opening coaxially provided at one end of the cell body 51 and is securely fitted therein such as by O-rings 54. An aperture through which the particle-containing fluid is caused to flow is formed within a ruby or other suitable element 56 disposed within an opening provided in the side of support 50, with the aperture in alignment with an input passage 58 which communicates with input nozzle 60. The ruby 56 is for example maintained within support 50 by a press fit. A visual marking 53 is provided on an end of aperture support 50 and in the illustrated embodiment is located to indicate aperture alignment when the marking is facing vertically upward.

The aperture within ruby 56 also communicates with an opening 61 formed in the inner end of support 50 and which in turn communicates with a coaxial passage 62 formed within cell body 51. The electrode 36 is of rodlike configuration and is disposed within passage 58 with an end adjacent the aperture 56 and is connected to an electrical connector 64 formed within body 51. The passage 58 can be relatively narrow to provide relatively high-velocity flow which results in a wiping action along electrode 36 as fluid is caused to flow therein. The second electrode 38 is disposed within the opening 62 formed in body 51 and terminates in a second electrical connector 66 also formed within body 51. Connectors 64 and 66 are coupled by suitable interconnecting wires to input amplifier 40, as illustrated in FIG. 1. The flow tube 16 is coupled to cell 14 by means of a coaxial opening 68 formed in the end of body 51 opposite to support 50 and also containing O-rings 70 for sealing. A passage 72 is coupled to fluid passage 62 and includes an enlarged end portion or port 74 which is cooperative with a plunger 76 (FIG. 1) to provide venting of the cell. The plunger 76 is coupled to and operated by an electrically driven solenoid 78 which is energized by logic circuitry 26.

The construction of conductivity cell 14 permits the easy adjustment of the metering aperture within the fluid passage and also permits relatively easy cleaning and replacement of the aperture within the cell. The entire cell, which is easily installed and removed from the system, is electrically connected by means of connectors 64 and 66, and fluid coupled by simple installation of the cell onto an end of flow tube 16 and of input tube 12 to input nozzle 60.

During operation, fluid containing particles to be counted is drawn through passage 58, aperture 56 and thence via passage 62 into flow tube 16. Vent port 74 is closed by plunger 76 during an analytical run so that fluid is drawn by suction pump 20 through the system for the counting of particles therein. After a count has been accomplished, plunger 76 is automatically withdrawn from the associated port 74 to cause air to be drawn into the cell by operation of pump 20. The system is automatically purged after completion of a counting run and is thus in condition for a subsequent analytical run.

The automatic purging of fluid from the cell and the system after an analytical run offers major advantages over particle counting systems of conventional design. As discussed, automatic opening of the vent of the conductivity cell after a counting run causes air to be drawn into the cell with consequent purging of fluid within passages 61 and 62 of cell 14 and within flow tube 16. As a result of this purging operation, no fluid remains within the otherwise conductive path formed between electrodes 36 and 38 and the aperture disposed therebetween, and thus no conduction between electrodes occurs. An excitation voltage applied to the cell electrodes need not therefore be removed, as in conventional systems, since no fluid is present to permit conduction. Excitation is thus continuously applied to the electrodes when the system is energized, but conduction within the conductivity cell occurs only during an analytic run.

The absence of conduction after the system is vented also prevents electrolysis and consequent production of gas bubbles during the time occurring between runs. Such absence of conduction also permits the use of smaller electrodes since the conductivity of the electrodes is not materially diminished by formation of gas bubbles on the surface thereof such as occurs to a greater extent in conventional systems. It should be noted that although residual fluid may remain by capillary action within input passage 58, this residual fluid is not analyzed during a subsequent run since the actual fluid to be analyzed will flow through the cell aperture before a start signal is provided by photosensor 28.

The conductivity cell illustrated in FIG. 2A and described hereinabove is similar to the cell described in the above-mentioned copending U.S. Pat. application, Ser. No. 38,039; however, the cell shown herein employs an electrode configuration and placement which in many instances offers advantages in particle counting operation. Referring to FIG. 2A, it is evident that electrode 38 is disposed within passage 62 in a position downstream of vent passage 72. In this position, gas bubbles, which tend to form due to electrolysis during conduction between the cell electrodes, appear on the surface of electrode 38 in a position downstream of the vent 72. During venting of the cell, these gas bubbles are more readily purged from the system than when the electrode is upstream of the vent. To further enhance the purging of such gas bubbles, electrode 38 is disposed along the bottom surface of passage 62 to cause formation of gas bubbles essentially on the upper surface of the electrode within the path of fluid flow and in a position to be more readily purged upon the introduction of air into the system by opening of vent port 74.

Figure 2B:
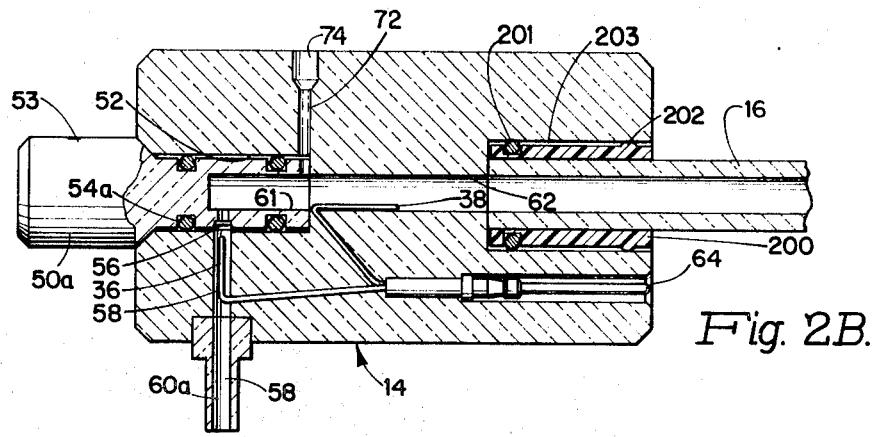
FIGS. 2B–2E are sectional elevation views of alternative embodiments of conductivity cells according to the invention.

An alternative cell construction is illustrated in FIG. 2B in which the aperture support 50a includes O-rings 54a provided around the end thereof in place of the O-rings formed within the cell body in FIG. 2A. Similarly, the flow tube 16 inserted within the output end of the cell includes a plastic or other suitable sleeve member 200 which includes an O-ring 201 on an end thereof and a ridge 202 to provide a positive sealing fit of flow tube 16 within a cylindrical opening 203 provided in the output end of the cell. The sealing elements of the cell are formed on external surfaces of sleeve 200 and support member 50a, rather than within the cell body, which in some instances can result in lower manufacturing cost. In this embodiment, input nozzle 60a is a separate element inserted into an opening in the body of cell 14 rather than being integrally formed with the body.

Figure 2C:
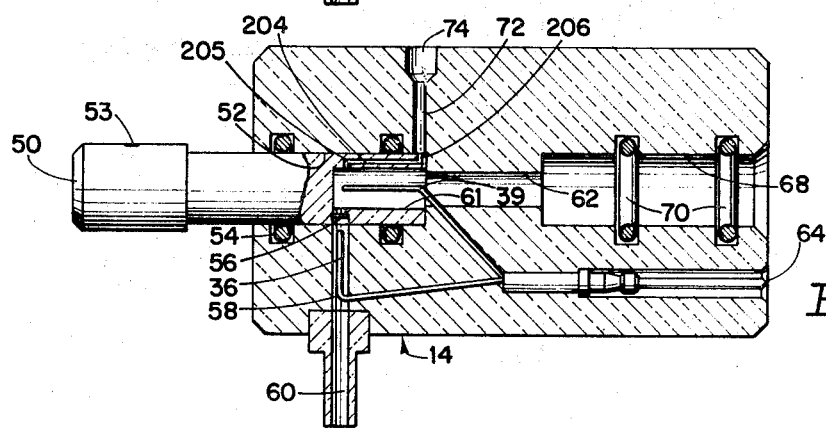

A further embodiment is illustrated in FIG. 2C wherein electrode 39 faces in a direction opposite to electrode 38 of FIG. 2A. Electrode 39 is disposed within the passage 61 of support member 50 with its end confronting aperture 56. A generally Z-shaped passage 204 is provided in the inner end of support member 50, having an orifice 205 confronting passage 61 near the inner end thereof and an orifice 206 confronting vent passage 72. The passage 204 serves as an extension of the vent passage to provide venting of the cell substantially at the fluid entry point. Air drawn into this embodiment via vent port 74 causes purging of the system substantially throughout the entire fluid path within the cell. The passages 61 and 62 and flow tube 16 are efficiently purged of fluid and entrained gas bubbles are also readily removed.

Figure 2D:
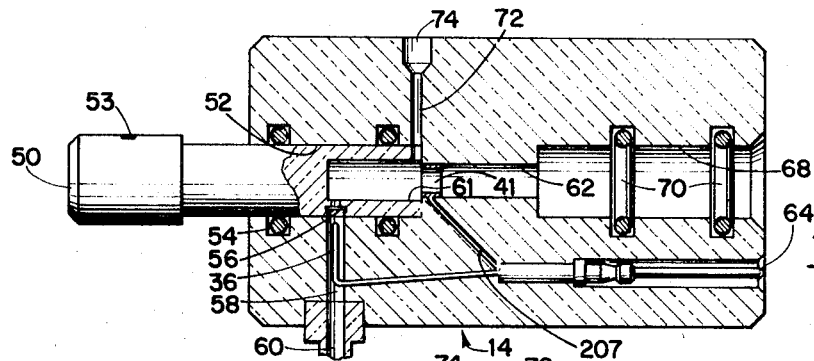
Figure 2E:
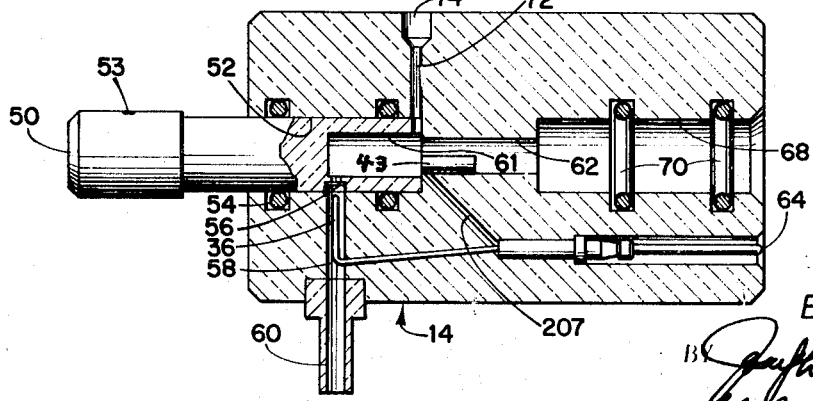

Referring to FIG. 2D, a cell embodiment is shown in which a thin cylindrical or sleevelike electrode 41 is provided within output passage 62, in place of the rodlike electrodes described hereinabove. Electrode 41 is typically formed of platinum and is disposed within passage 62 at a position adjacent the inner end of support member 50. The electrode can be press fit in passage 62 and is electrically attached to lead wire 207 for connection to terminal 66. A further alternative construction is depicted in FIG. 2E wherein an electrode 43 within passage 62 is of thin foil form and is disposed along the bottom portion of passage 62. The foil electrode 43 is electrically connected to lead wire 207 as above, and is typically bonded within passage 62 by an epoxy or other suitable cement.

The sleeve and foil electrode configurations offer a relatively large electrode surface area, and are disposed within the cell in a manner which does not materially detract from fluid flow through the cell. In the event that thicker electrodes 41 or 43 are employed, the electrodes can be disposed within an undercut portion provided in the cell such that the electrode surface is coplanar with the surface of passage 62. The electrodes 41 and 43 can also be formed within the cell by well-known film deposition techniques. Alternatively, electrode 36 can also be of sleeve or foil configuration.

Figure 3:
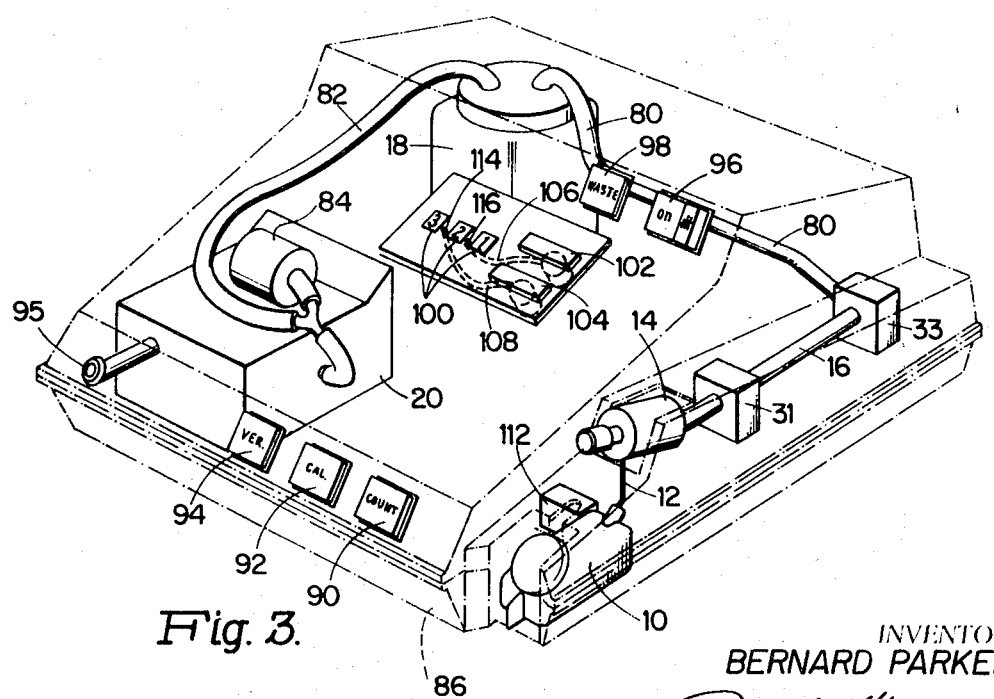
FIG. 3 is a pictorial view, partly in phantom, of a particle counting system embodying the invention, in a typical packaging arrangement.

The system in which the invention is employed is typically packaged within a compact housing which is of a size and configuration adapted for desk top operation. The general packaging arrangement is illustrated in FIG. 3. The conductivity cell 14 and its associated flow tube 16 are arranged in the illustrated embodiment on the right-hand side of the cabinet 86 with metering photosensors 28 and 30 and associated light sources 32 and 34 being contained within respective housings 31 and 33 disposed around flow tube 16. Tube 16 is coupled via tubing 80 to waste bottle 18 which is also coupled via tubing 82 to suction pump 20 and associated flow regulator 84 for providing a uniform flow rate. The sample flask 10 is inserted within the system in the manner illustrated with input tube 12 disposed within flask 10 for withdrawal of fluid therefrom into cell 14.

The instrument cabinet 86 includes a section on the right-hand side thereof which includes an opening for simple insertion of a sample flask 10, and an upper opening for easy access to aperture support 50 of conductivity cell 14 for the adjustment or replacement of the metering aperture. A nozzle 95 is coupled from pump 20 to the front panel of housing 86 to provide a source of positive air pressure for blowing out support 50 and the aperture therein. Support 50 is placed coaxially onto nozzle 95 to clean the aperture. The controls and indicators are contained on instrument housing 86 and include a count control 90, calibrate control 92, verify indicator 94, on-off control 96 and waste indicator 98. In the illustrated embodiment, the controls are of the self-illuminating pushbutton type.

The particle count is displayed on a three-digit electromechanical counter which includes digital output indicators 100; a white blood cell indicator 102 and a red blood cell indicator 104 are provided to denote which cell count is being displayed and to indicate the correct count multiplier. Fiberoptic or other light transmitting cables 106 and 108 are respectively coupled from the lamps associated with indicators 102 and 104 to positions between the digits of indicator 100 to provide selective decimal point indication depending upon whether a red blood cell count or a white blood cell count is being performed. As described in the above-mentioned copending U.S. Pat. application, Ser. No. 38,039, a switch 122 is selectively activated by respective sample flasks 10 used for red and white blood cell analysis to cause corresponding activation of indicators 102 or 104 and associated decimal point indicators 116 or 114 to appropriately display the correct count magnitude.

The invention is not to be limited by what has been particularly shown and described except as indicated in the appended claims.

What is claimed is:

1. A conductivity cell for counting particles suspended within a liquid, comprising:

a cell body having an input passage formed therein and adapted to be coupled to a supply of liquid to be analyzed, and an output passage formed therein and adapted to be coupled to a flow tube through which liquid flows for analysis;

a vent passage formed in said cell body and having an end communicating with said output passage;

a support member having an aperture provided in a surface thereof, said support member being removably disposed within said cell body with said aperture in alignment with said input passage, said support member having a fluid passage formed in an end thereof and communicating between an opposite end of said aperture and the output passage of said cell body, said support member being of elongated configuration and when disposed within said cell body having a portion which extends outwardly therefrom;

a first electrode disposed within said input passage and confronting one end of said aperture;

a second electrode disposed within said output passage at a position downstream from said end of said vent passage;

said first and second electrodes are each of rodlike configuration and said second electrode has its entire active surface at a position downstream from said end of said vent passage; and means within said cell body for providing electrical connection from said first and second electrodes to respective terminals disposed on said cell body.

2. A conductivity cell for counting particles suspended within a liquid, comprising:

a cell body having an input passage formed therein and adapted to be coupled to a supply of liquid to be analyzed, and an output passage formed therein and adapted to be coupled to a flow tube through which liquid flows for analysis:

a vent passage formed in said cell body and having an end communicating with said output passage;

a support member having an aperture provided in a surface thereof, said support member being removably disposed within said cell body with said aperture in alignment with said input passage, said support member having a fluid passage formed in an end thereof and communicating between an opposite end of said aperture and the output passage of said cell body, said support member being of elongated configuration and when disposed within said cell body having a portion which extends outwardly therefrom;

a first electrode disposed within said input passage and confronting one end of said aperture;

a second electrode disposed within said output passage at a position downstream from said end of said vent passage;

said second electrode being of sleevelike configuration; and means within said cell body for providing electrical connection from said first and second electrodes to respective terminals disposed on said cell body.

3. A conductivity cell for counting particles suspended within a liquid, comprising:

a cell body having an input passage formed therein and adapted to be coupled to a supply of liquid to be analyzed, and an output passage formed therein and adapted to be coupled to a flow tube through which liquid flows for analysis;

a vent passage formed in said cell body and having an end communicating with said output passage;

a support member having an aperture provided in a surface thereof, said support member being removably disposed within said cell body with said aperture in alignment with said input passage, said support member having a fluid passage formed in an end thereof and communicating between an opposite end of said aperture and the output passage of said cell body, said support member being of elongated configuration and when disposed within said cell body having a portion which extends outwardly therefrom;

a first electrode disposed within said input passage and confronting one end of said aperture;

a second electrode disposed within said output passage at a position downstream from said end of said vent passage;

said second electrode being of foil configuration and disposed along a bottom portion of said output passage; and means within said cell body for providing electrical connection from said first and second electrodes to respective terminals disposed on said cell body.

* * * * *